(12) United States Patent
Butler (10) Patent No.: US 12,486,123 B2
(45) Date of Patent: Dec. 2, 2025

(54) HARVESTING MECHANISM INTEGRATING MANUAL CROP PICKING WITH AUTOMATED FULL-CONTAINER PALLET ACCUMULATION

(71) Applicant: Paul Butler, Fairview, TN (US)

(72) Inventor: Paul Butler, Fairview, TN (US)

(*) Notice: Subject to any disclaimer, the term of this patent is extended or adjusted under 35 U.S.C. 154(b) by 533 days.

(21) Appl. No.: 18/056,397

(22) Filed: Nov. 17, 2022

(65) Prior Publication Data

US 2024/0166454 A1    May 23, 2024

(51) Int. Cl.
| | | |
|---|---|---|
| *B65G 47/90* | (2006.01) | |
| *A01D 46/30* | (2006.01) | |
| *B65G 57/03* | (2006.01) | |
| *B65G 59/10* | (2006.01) | |

(52) U.S. Cl.
CPC .......... *B65G 47/905* (2013.01); *A01D 46/30* (2013.01); *B65G 57/03* (2013.01); *B65G 59/106* (2013.01); *B65G 2201/0235* (2013.01)

(58) Field of Classification Search
CPC ...... A01D 46/30; B65G 47/905; B65G 57/03; B65G 59/106; B65G 2201/0235
See application file for complete search history.

(56) References Cited

U.S. PATENT DOCUMENTS

| | | |
|---|---|---|
| 3,679,081 A | 7/1972 | Duncan, Jr. |
| 4,590,739 A | 5/1986 | Abatti et al. |
| 7,669,398 B1 | 3/2010 | King et al. |
| 7,882,686 B2 | 2/2011 | Bryan, Jr. et al. |
| 8,991,140 B2 | 3/2015 | Dorn et al. |
| 2006/0053765 A1 | 3/2006 | Meester |

FOREIGN PATENT DOCUMENTS

| | | | | |
|---|---|---|---|---|
| AU | 2019404207 | | 6/2020 | |
| AU | 2019358807 | | 5/2021 | |
| AU | 2019404207 B2 | * | 12/2023 | ............. G06V 20/58 |
| CA | 3127728 A1 | * | 7/2020 | ............. B65G 43/08 |
| WO | WO-2020076616 A1 | * | 4/2020 | ........... B65G 47/902 |

* cited by examiner

*Primary Examiner* — Joseph M Rocca
*Assistant Examiner* — Douglas J Meislahn
(74) *Attorney, Agent, or Firm* — Harpman & Harpman (57) ABSTRACT

A harvesting system incorporating manual picking to bins at varying heights and positions with an automated accumulation of filled containers in unit loads is disclosed and claimed. The system includes a powered rolling chassis driven between crop rows or lanes. The chassis has an adjustable front-mounted operator platform with controls, allowing one person to operate the system. A container pick-and-place apparatus and a container dispenser are mounted behind the platform to stack full containers in predetermined patterns in the unit load area and supply empty containers to the operator platform. The unit load area at the rear of the chassis has an indexer to allow staging of an empty unit load holder with empty containers for a quick changeover after removing a full load.

3 Claims, 7 Drawing Sheets

HARVESTING MECHANISM INTEGRATING MANUAL CROP PICKING WITH AUTOMATED FULL-CONTAINER PALLET ACCUMULATION

BACKGROUND OF THE INVENTION

1. Technical Field

Embodiments of the invention described herein pertain to agricultural harvesting equipment incorporating automated handling and accumulation systems. The apparatus embodies the ability to improve manual harvesting methods at ergonomically-positioned heights. The embodiment described uses mechanization to handle full and empty product accumulation containers. The automated handling system produces unit pallet loads, creating efficiencies in transport processes. The pallet system holds an empty and a full pallet and will index an empty pallet to the stocking position.

Many agricultural crop harvests are highly automated. Combines, first documented in the early 1800s, are now automated to the point of driverless crop planting, tending, and harvesting. Mechanization is commonplace for processing root crops, legumes, nuts, fruits, vegetables, and other agricultural products. Mechanization and automation have not progressed to the point of being economical or standard industry practice for harvesting many table-grade fruits, vegetables, and other produce.

Manual harvesting from zero to six feet above the ground is typically an inefficient, non-ergonomic, labor-intensive process. Operators pick the product, fill one bin (tray, bag, basket, box, tote, or other container) at a time, and manually transport the vessel to an accumulation area. The product is then transferred to another container to prepare for shipping and further processing. Each additional handling step is inefficient and can damage the product. Operators bend, squat, twist, and reach to harvest various products while balancing a product load. The poor work positions can create chronic musculoskeletal hardships. The workers often perform at a high rate of speed due to piece-rate pay, time-sensitive harvests, and other reasons. This increases the repetition of forces encountered while working in poor posture positions. An operator supports and balances the picking container and frequently transports full containers to a central gathering point. The transport is an inefficient process. The high-labor content and poor ergonomics in manual harvesting processes create crop harvesting personnel shortages.

2. Description of Prior Art

Carts are a traditional method of accumulating manually picked crops. Advancements in product accumulation, like the bin carrier in U.S. Pat. No. 3,679,081 or the autonomous cart in patent AU2019404207 A1 reduce transporting bins and carriers manually, but they are still carts.

Accumulating parts in bins and other containers is another area showing advancements. U.S. Pat. No. 8,991,140B2, a harvest aid machine for ground crops, uses conveyors to transport and accumulate totes for transfer to another device. Seating is provided for operators to improve their comfort. Although the system has advantages, operator positions are not flexible, a separate driver is necessary, and the totes are manually transferred to the next process step. The size of the machine makes it impractical for a smaller farming operation.

U.S. Pat. No. 4,590,739 addresses handling containers from step to step by incorporating a shuttle to off-load products from a mobile harvesting platform. The system is designed for melons and other large ground crops and includes sorting, cleaning, and containerizing processes. Accumulation and transfer to a shuttle minimize full-container transfer time and labor.

A small-scale tomato harvester addresses the large size of U.S. Pat. No. 4,590,739. US Patent 2006/0053765 A1 is designed for tomatoes and other vine crops. The machine harvests and separates crops from tillage and accumulates the products in hoppers or bins. It assists the poor ergonomics of picking by replacing manual labor with automation. The drawbacks are that it isn't flexible for multiple products, handling for table grade produce is limited, and transfer to the next process step is manual.

Operator ergonomics are partially addressed in 'cherry-pickers' like U.S. Pat. No. 7,669,398B1. Tubes are used to deliver manually picked fruit to a conveyor; a separate hopper accumulates the fruit. U.S. Pat. No. 7,882,686B2 improves on this concept with accumulation in a hopper that conveys to the ground for other equipment to transport to the next step. The mobile system for enhancing the picking and preliminary processing of apples, citrus, stone fruit, and objects has an accumulation point for culled fruit. The system addresses operator ergonomics at heights above four feet and has flexibility for harvesting round fruits at lower elevations with a modified design. The disadvantages include high cost, high weight, and the requirement for a driver. The picking stations are represented as adjustable chairs without safety railings or toe boards. The unloading method of dropping containers to the ground requires a separate operation to pick up and transport each bin filled.

Mechanization and automation to replace manual picking show signs of advancement. Vision systems, end-of-arm tooling, and robotics combined with software and sensors can define ripeness and pick the product. At this time, for crops requiring judgment, dexterity, and flexibility, hand-harvesting is more economical. The field of robotically harvested produce is advancing in individual products. An example is an autonomous crop harvester, as in patent AU2019358807A1. Primarily designed for asparagus, adaption to other products like rhubarb or celery would require design iterations. Automated strawberry harvesters are also commercially available. They are specifically designed for one product.

Mechanization has proved more economical than manual labor with many crops. Mechanism and automation have not become economical enough to replace manual labor for most retail-bound produce harvesting operations. There is a need to improve the manual processes. There is a need for a single-operator, hybrid manual picking, and mechanized accumulation system to handle products from artichokes to zucchini in a cellular configuration that increases efficiencies while enhancing safety and quality. There is a need to reduce table-ready produce handling steps by collecting product loads in standard pallet configurations.

SUMMARY OF THE INVENTION

The presented invention is a manual-picking, motorized, agricultural product harvesting apparatus with continuous flow capabilities (hybrid harvester). The invention addresses the above needs to improve ergonomics, efficiency, and quality.

The present invention consists of a powered rolling chassis with a drive system. The drive system provides auxiliary power for an operator platform, a tote dispenser, a container pick-and-place system, and a pallet indexing system. The embodiment presented provides an improved method to hand-harvest crops utilizing a flexible platform to allow comfortable operator positions. The system offers an enhanced approach to autonomously handle agricultural harvesting containers. The invention enables accumulating containers in a standard transport configuration utilizing pallets or other dunnage. The design aims to provide a cellular-based picking-and-packing station to improve safety, increase quality, and improve the efficiencies of manually harvested crops at an affordable price.

DETAILED DESCRIPTION OF THE INVENTION

Referring to FIGS. 1-5 of the drawings, a harvester and product palletizing system 10 of the invention can be seen having a rolling chassis 11, a harvesting station 12, a tote dispenser portion 13, a pick and place portion 14 and a product tote pallet indexer assembly 15.

The rolling chassis 11 has a frame 16, a pair of spaced wheel assemblies 17, a power source (not shown), a hydraulic pump 19, and a central control panel 20.

Referring now to FIGS. 1, 3, 5, and 6 of the drawings, the harvester station 12 defines a picker platform 21 extending from the chassis frame 16 with an adjustable chair 22; in this example, operator controls 23 with integration of safety sensors for the platform inclusive of emergency pull cords and an e-stop button which is well known within the art.

This orientation allows a single operator (not shown) to run the harvester from the picking position. A hydraulic adjustment arm 25 assembly extends from the frame 16, allowing for platform adjustment thereto on multiple axes as to rotation, up and down positioning, forward and back, and side-to-side tilt to maintain an optional operable height and angle to the harvest target crops (not shown).

The tote dispensing portion 13 transfers empty totes 26 to a tote dispenser 30. This is done manually or through automation using a powered pick and place articulated transfer arm 31. In an automated sequence, the arm 31 senses the totes orientation and picks an empty tote 26 off a tote stack 27A. It then transports the empty tote to the tote dispenser 30 and sets it into the guide arms 33 extending therefrom. Alternatively, the empty totes 26 may be manually loaded in the guide arms 33 placed on the picking and staging tote holder shown in FIG. 8.

Figure 1:
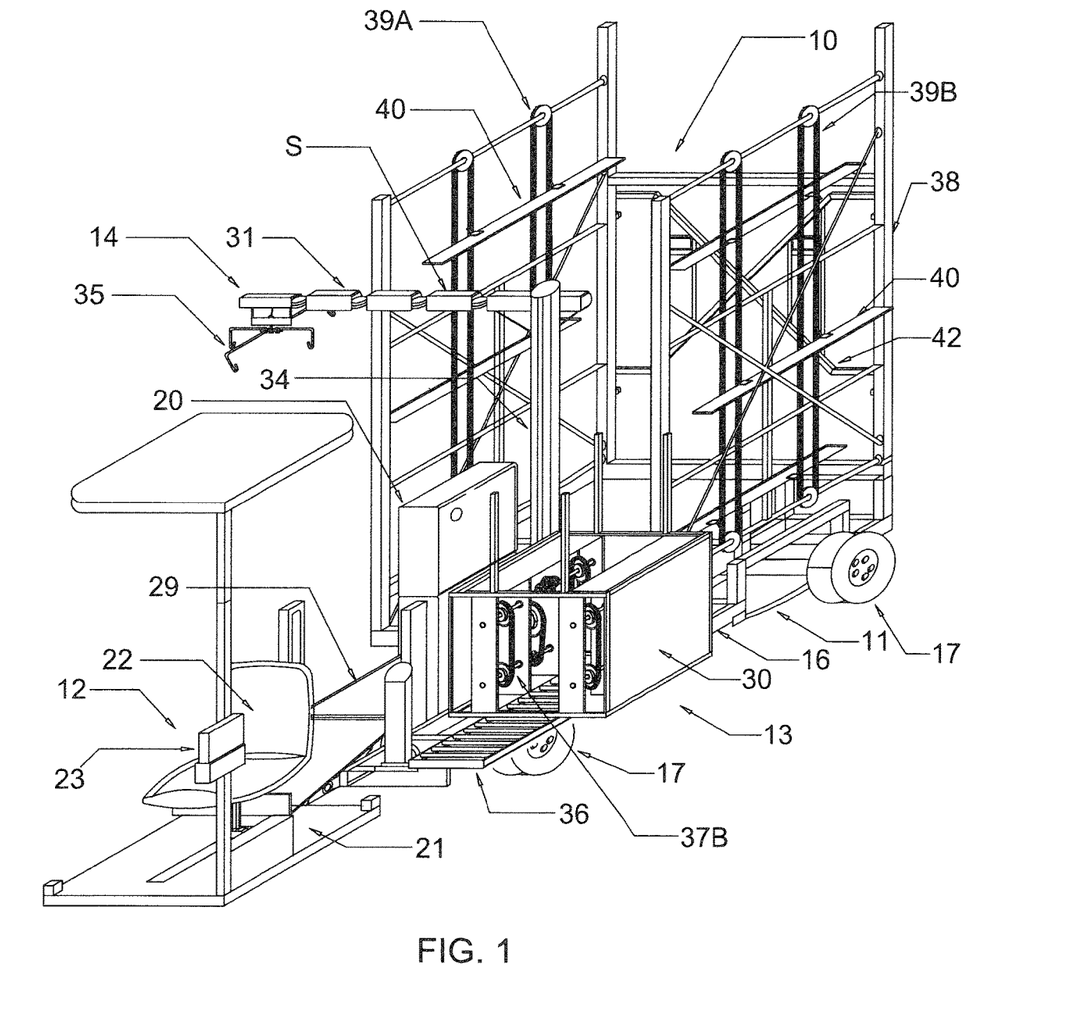
FIG. 1 is a front, top and right-side perspective view of the invention.
Figure 2:
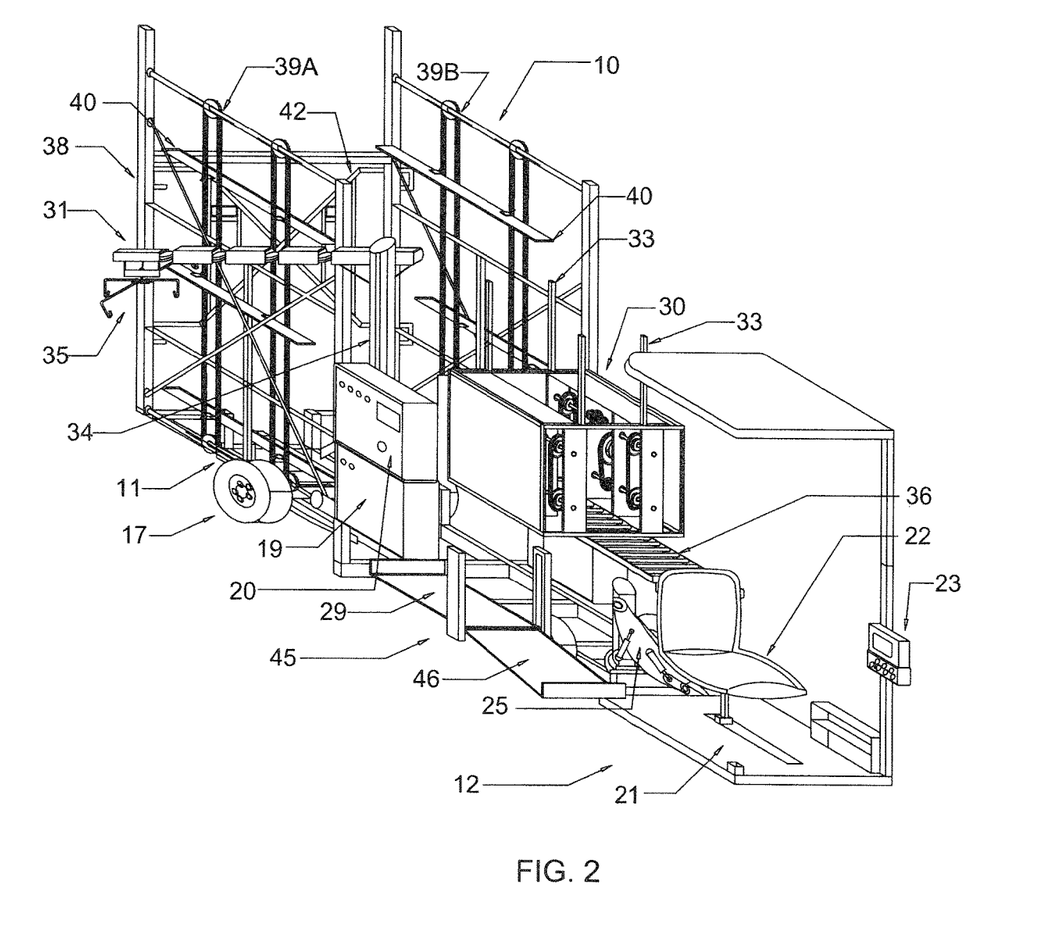
FIG. 2 is front, top, left side perspective view thereof.

The pick and place articulated transfer arm 31 is mounted on a jib crane 34 with a tote engagement tooling 35 on its respective free end for selective grasping of individual totes so positioned, as seen in FIGS. 1 and 2 of the drawings.

The articulated arm 31 is formed of multiple pivoted segments S, allowing for positional grasping of selective totes 26, as noted, and placement thereof as required keeping the orientation to the ground as the entire harvesting device 10 moves. The pick and place articulated transfer arm 31 uses control logic to stack full totes 27 on pallets 28 in a predetermined pattern. The transfer arm 31 is triggered to pick up a full tote 27 from a sensing system on a full tote pick-up spot 29. It will be evident that a robotic arm with the proper end-of-arm tooling may be an alternate embodiment of this feature in the same spirit of the invention. The pick and place articulated arm 31 transfers full tote containers to the pallet 28 until it is complete. To unload, the operator stops the harvester to allow a forked vehicle (not shown) to stock an empty pallet and totes and unload a full pallet, as will be described hereinafter.

Figure 3:
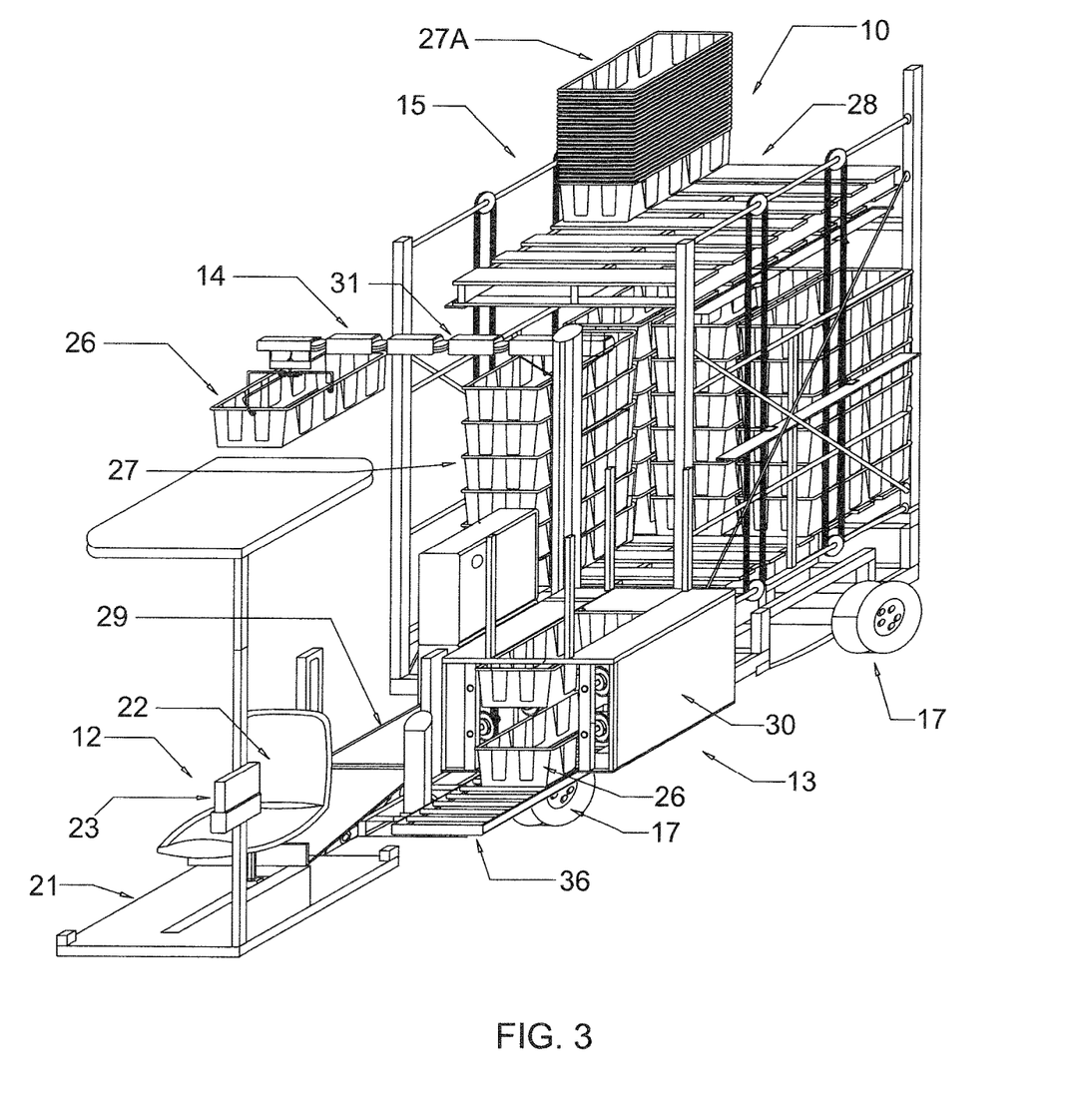
FIG. 3 is a perspective view of the invention with product totes thereon.
Figure 8:
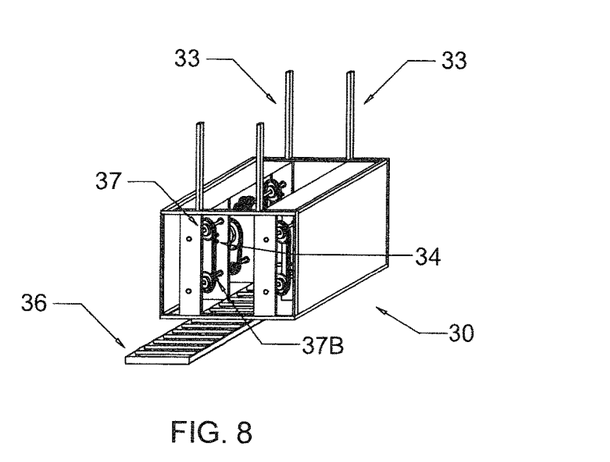
FIG. 8 is an isolated perspective view with portions broken away of an empty product tote dispenser handler.
Figure 9:
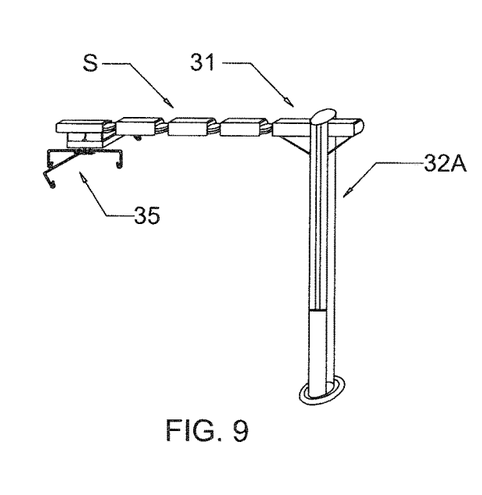
FIG. 9 is an isolated perspective view of a jib crane of the harvester with an articulated pick and place armature positioned thereon.
Figure 10:
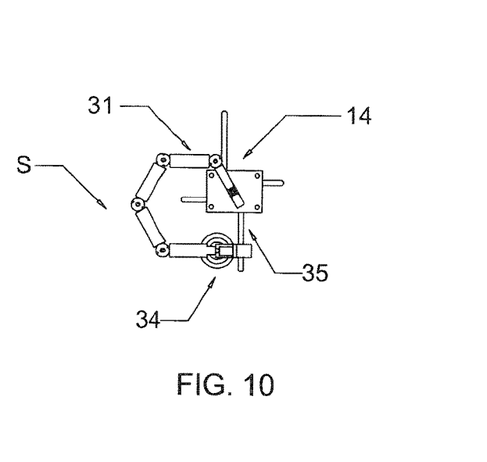
FIG. 10 is a top plan view of the jib crane and armature in folded segmented position.

Once a stack of empty totes 26 is loaded inside the guide arms 33 of the tote dispenser 30, gravity lowers them until the lip of the bottom tote is stopped by chain-driven lugs 34, best seen in FIG. 8 of the drawings. When a conveyor 36 positioned under the dispenser is empty, a sensor signals the control system to activate the tote dispenser 30. The top gear assembly 37 rotates far enough to transport one tote 26 to the lower projections using lugs 34. Lower chains and lugs 37B are geared to move a tote down sufficiently to place it on the conveyor 35. The empty tote then flows to a pick-up point on the conveyor 36 for the operator, as seen in FIG. 3 of the drawings.

The operator transfers the empty tote 26 to the front portion 46 of the tote work-and-transfer unit 45. The operator then fills the tote with the product and transfers it to the pick-up position 29. This signals the transfer arm 31 for the next automated step of stacking the filled totes 27 on a pallet 28 in the pallet indexer assembly 15, as will be described in detail hereinafter.

Figure 5:
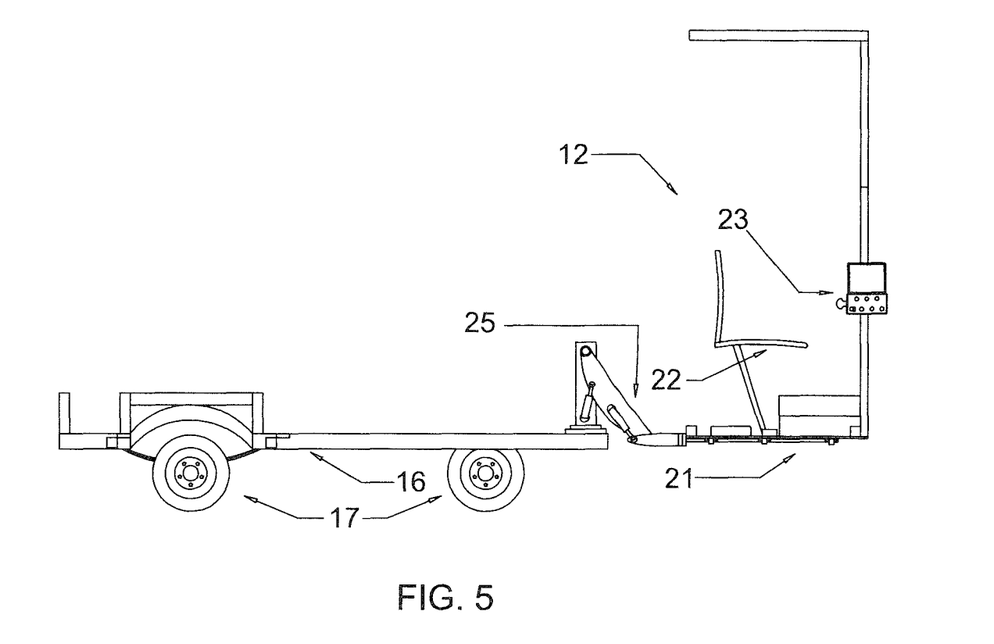
FIG. 5 is a graphic side elevational view representation with portions broken away to illustrate the operator access harvesting position.
Figure 6:
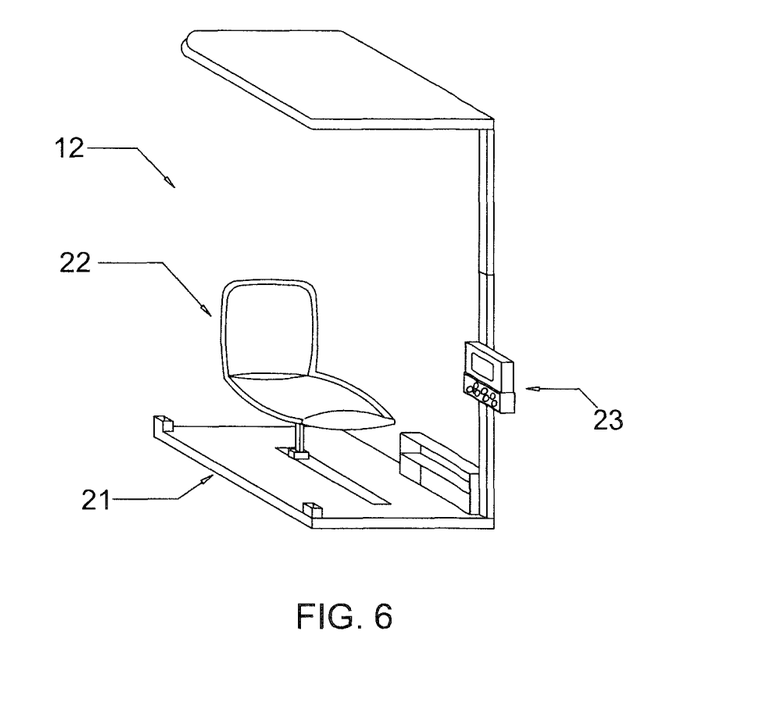
FIG. 6 is an isolated perspective view of the operator's platform seat and assembly control.

The manual steps before stacking full totes 27 include filling the empty totes 26. An operator on the picker platform 21 fills the totes and runs the harvesting apparatus. They drive the unit to the crops and adjust the platform 21 to the optimal picking angle. This iteration shows a platform 21 with its hydraulic arm 25, as seen in FIG. 5 of the drawings. As noted, this allows the operator to adjust the platform 21 for uneven ground. The platform height is limited to thirty-six inches from the ground without additional safety precautions. The height restriction isn't applicable with an installed toe-board, side rails, and an operator harness (not shown). The controls 23 enable the operator to adjust the platform axis in five planes (left and right rotation, up and down, forward and back, tilt forward and back, and tilt side to side) to position it at the optimal height and angle to harvest the target crops as hereinbefore described.

In operation, the operator transfers the full tote 27 to the back of the picking and staging tote holder. Sensors detect the tote. The pick-and-place transfer arm 31 grasps the full tote and places it in a predetermined position on the indexed pallet 28, as noted.

Referring now to FIGS. 1-4 and 11 of the drawings, the pallet indexer 15 can be seen as having a support frame 38 with a pair of spaced parallel support assemblies 39A and 39B. Each pallet support assembly is chain driven with pallet support rails 40 spaced vertically and respectively driven by an electric motor M.

Figure 11:
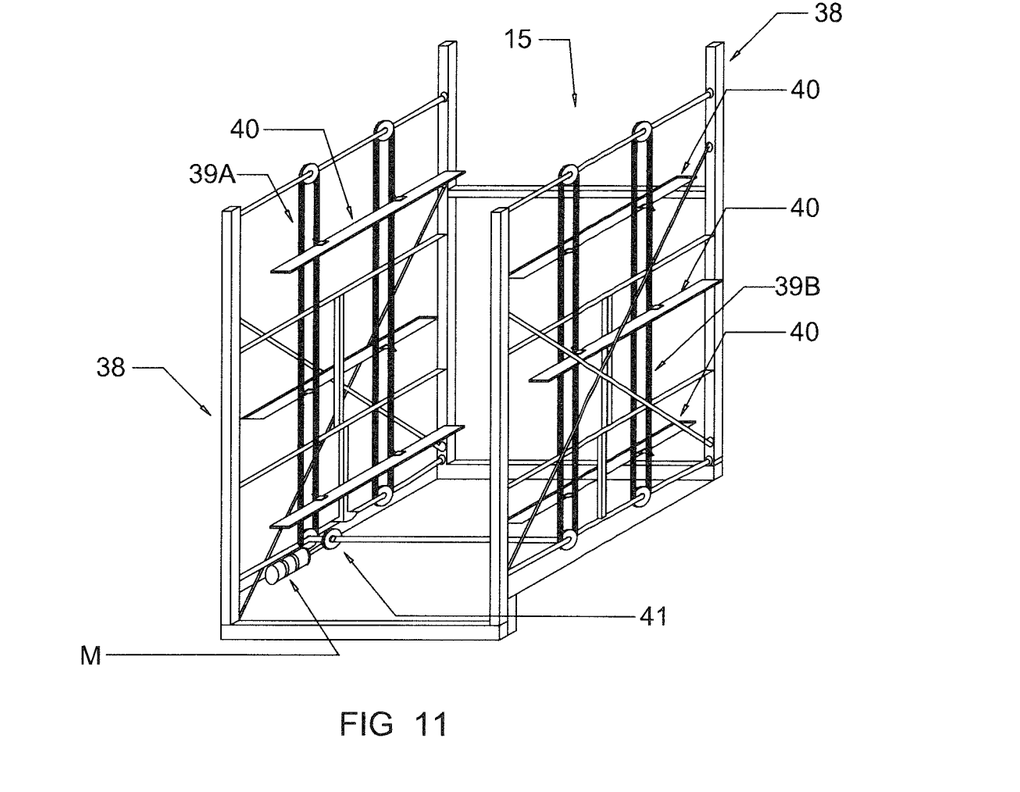
FIG. 11 is an isolated perspective view of the pallet indexer of the harvester.

A central drive shaft 41 connects and communicates with both chain drives, assuring operational efficiency.

The pallet support rails 40 are made of flat bar metal stock with gussets and rotate around the chain drives to hold empty pallets at the top and to be filled pallets at the bottom.

Referring back to FIGS. 1, 2, and 12 of the drawings, the pallet tote product indexing can be seen wherein a back gate 42 will allow access for a forklift vehicle (not shown) for unloading the pallets. The back gate 42 has forklift registration tubes 42A to facilitate quick removal.

Figure 12:
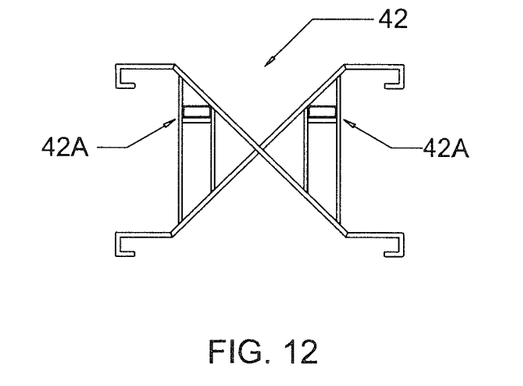
FIG. 12 is a front elevational view of a pallet indexer removable access rear gate.

Once a full pallet is removed, the gate 42 is repositioned, and the pallet indexer lowers an empty pallet for the next cycle. The gate can also be manually removed if needed.

Figure 4:
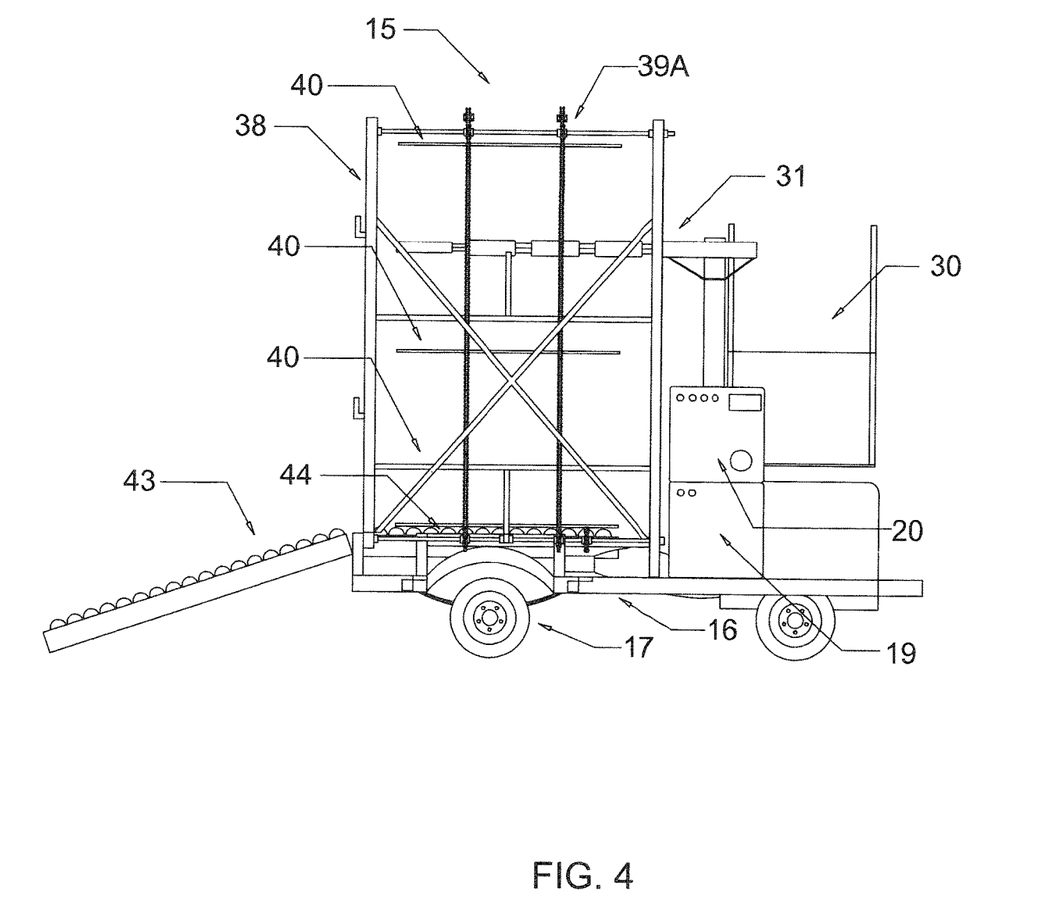
FIG. 4 is a partial graphic side elevational view of the invention with a manual loading and unloading conveyor attached thereto.

Alternately, manual loading and unloading of the index pallets can be achieved wherein an access conveyor 43 is positioned to extend from the ground, as seen best in FIG. 4 of the drawings. The conveyor 43 is stored within the frame 16 of the harvester when not in use for quick access.

As noted, two roller conveyors are illustrated for manual loading or unloading a pallet if the fork vehicle is unavailable. As noted, one conveyor is stored in the frame area, is pulled out, and lowered to the ground for pallet changeover. A secondary pop-up conveyor 44 is mounted in the bed with the ability to be raised to facilitate the pallet transfer. A winch (not shown) lowers the pallet to the ground and pulls a new pallet into position.

Figure 7:
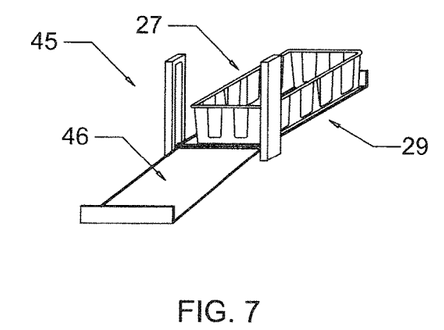
FIG. 7 is an isolated perspective view of a product tote staging platform.

It will be evident that the present embodiment uses nest and stack totes. The nested totes, as illustrated in FIGS. 3 and 7 of the drawings, stack when turned 180 degrees.

It will be evident to those skilled in the art that alternate configurations, such as boxes and trays or other containment devices, may be substituted and used.

The hybrid harvester is flexible for almost any agricultural product grown from ground level to six-plus feet above the ground. The harvester can be used for cucumbers, carrots, strawberries, flowers, nursery plants, and lettuce with a mat and kneeling block. Change the platform 21 to a chair or stool (not shown), and the hybrid harvester can be used for grapes, okra, blueberries, coffee, and other crops harvested three to six feet above the ground. Add in toe boards, rails, and a harness (not shown), and the platform can go above three feet for tree crops.

While the invention has been shown and described regarding the embodiment thereof, it will be appreciated by those skilled in the art that various changes in form and detail may be made without departing from the spirit and scope of the invention.

Therefore I claim:

1. A mobile multiple-height harvester machine for crops comprising in combination,
    a powered wheel chassis having a primary propulsion power source and an equipment power source and control unit,
    an adjustable operator platform having access movement controls for crop terrain extending from said chassis,
    an operator seat and controls on the said platform for orientation and picking of crops,
    a multi-access automated container handling unit,
    a product container dispenser having a multiple container receiving guided powered enclosure, a sequential vertical distribution of individual containers to a conveyor in communication with said powered enclosure for providing empty containers to an operator and a powered articulated extension arm, an arm tool on the free end of said articulated arm for grasping product containers, and arm control positional sensors for transferring containers to pallet indexer of for product containers having pairs of vertically spaced pallet engagement rails moving sequentially from a first pallet loading position to a second unloading pallet access position powered by an independent electric motor.

2. The mobile multi-height harvest machine set forth in claim 1 wherein said equipment power source comprises, a hydraulic pump.

3. The mobile multi-height harvesting machine set forth in claim 1 including an extendable roller ramp, and a pop-up roller bed to load and unload pallets from said automated positional indexer.

* * * * *